(No Model.) 2 Sheets—Sheet 2.
W. EVANS.
DRILLING MACHINE.
No. 335,184. Patented Feb. 2, 1886.
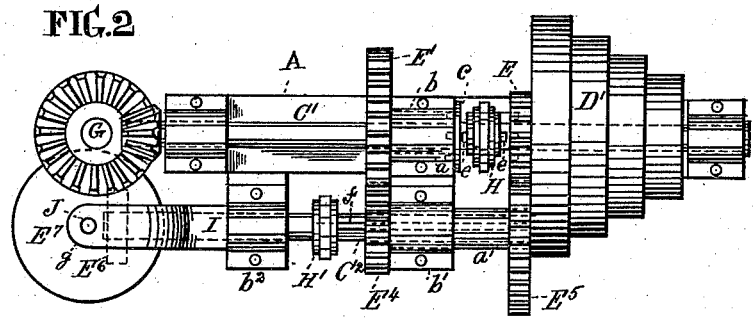
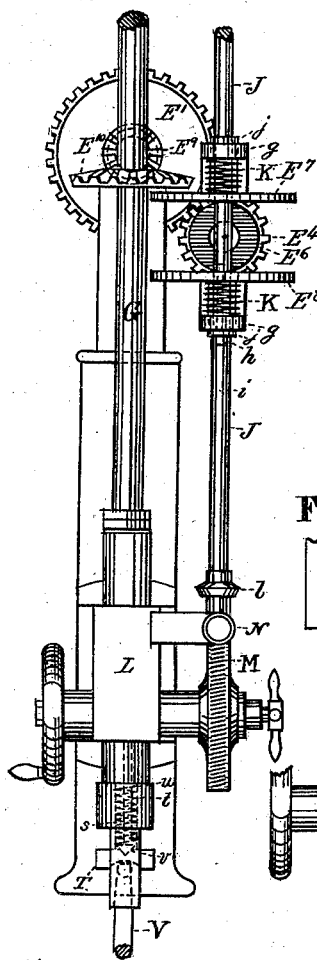
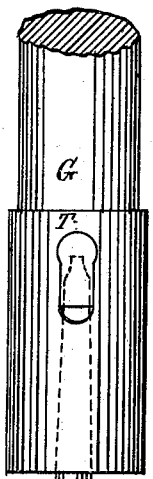
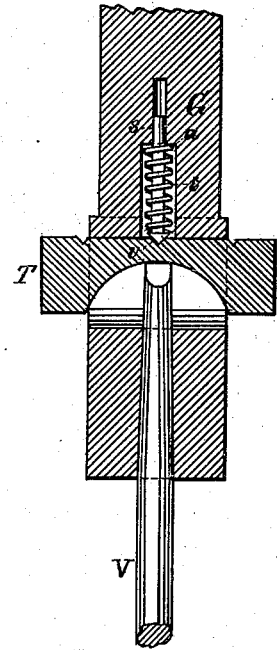
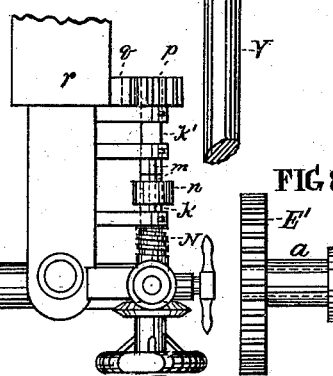
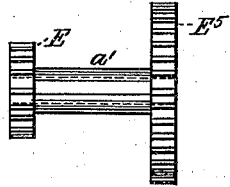
Witnesses.
S. E. W. Bewley,
John K. Evans.
Inventor.
William Evans.
per Thomas J. Bewley, Atty.

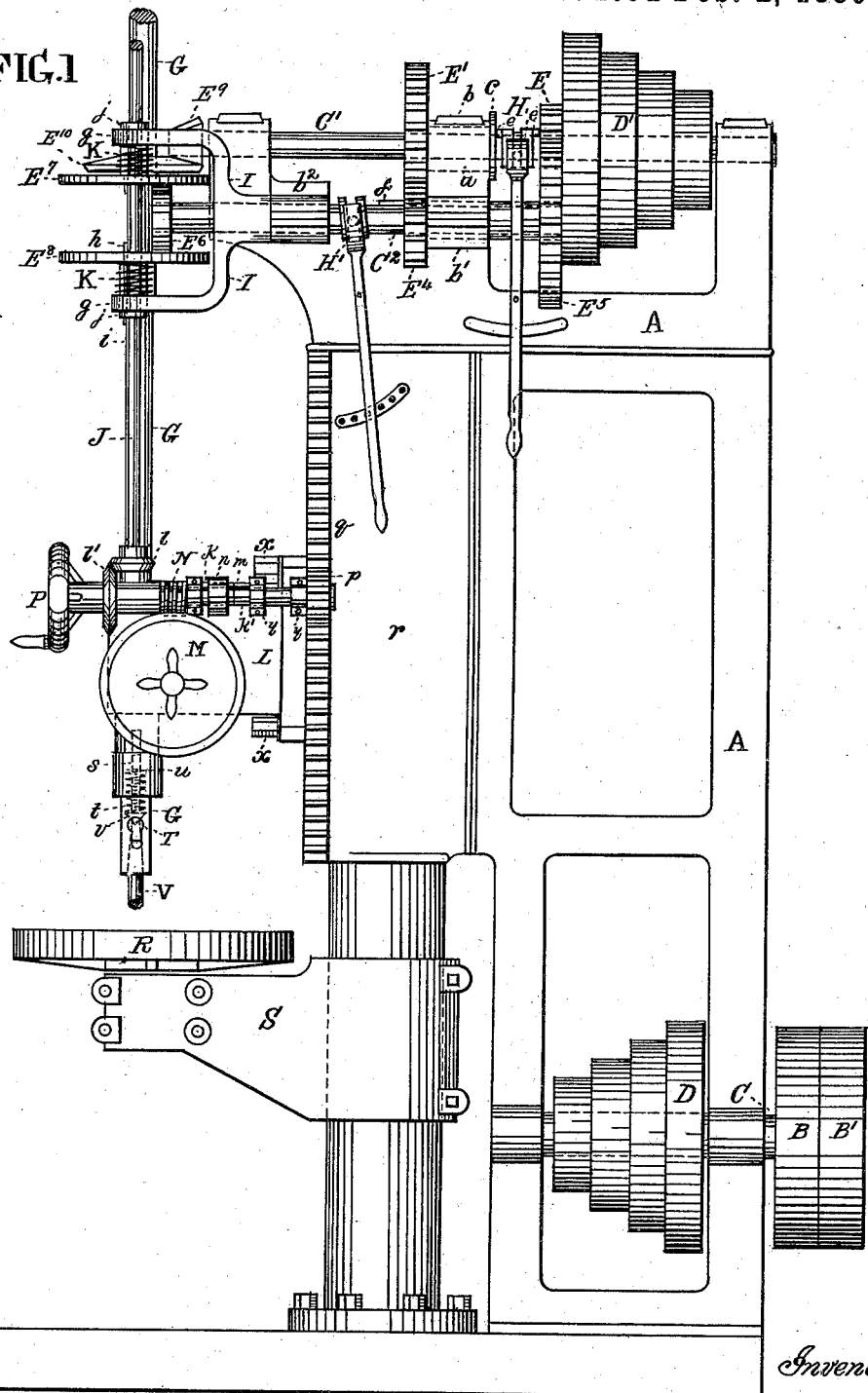

UNITED STATES PATENT OFFICE.

WILLIAM EVANS, OF PHILADELPHIA, PENNSYLVANIA.

DRILLING-MACHINE.

SPECIFICATION forming part of Letters Patent No. 335,184, dated February 2, 1886.

Application filed November 28, 1885. Serial No. 184,218. (No model.)

*To all whom it may concern:*

Be it known that I, WILLIAM EVANS, a citizen of the United States, residing at Philadelphia, in the county of Philadelphia and State of Pennsylvania, have invented certain new and useful Improvements in Drill-Presses, of which the following is a specification.

The invention relates, in the first place, to mechanism for changing the velocity of the shaft that imparts rotary motion to the drill-spindle; in the second place, to imparting rotary motion at specified degrees of velocity to the feed-shaft; in the third place, to the means employed for changing the position altitudinally of the feed-shaft and movable head of the press at one operation; in the fourth place, to a drift pin or key in a slot of the drill-spindle; and the invention consists, in the first place, in providing the driving-shaft through which motion is imparted to the drill-spindle with a cone-pulley, to which a pinion is rigidly connected at one side, both loose upon the shaft. Upon the same shaft there is a gear-wheel connected to a sleeve turning loosely in a separate bearing, and provided with a collar to prevent lateral motion. Connection to cause the cone-pulley and its pinion to become tight upon and revolve with the shaft or the gear-wheel with its sleeve and collar at option is effected by means of a clutch upon said shaft, which is situated between said pinion and gear-wheel, which may be shifted to connect with either to vary the velocity of the shaft. A counter-shaft having a spline is hung in bearings on the side of the press, having gear-wheel and pinion connected by a sleeve passing through one of the bearings. This wheel and pinion gear into the pinion and wheel, respectively, that are situated upon the driving-shaft.

The invention further consists in the combination of a friction-wheel situated upon the forward end of the counter-shaft with a pair of disk-wheels upon the feed-shaft, the upper one of which is loose, while the lower is keyed, so as to permit vertical motion to the shaft. This counter-shaft has a spline-connection through its gear and sleeve that permits of longitudinal movement therein, by means of a clutch, to move the friction-wheel to any position upon the faces of the disk-wheels within their circumferences to impart different degrees of velocity to the feed-shaft.

The invention also consists in providing the movable head with a stud-shaft supported in bearings upon the side thereof, which has a pinion upon the outer end, the teeth of which mesh into those of a rack placed vertically upon the side of the column of the press. This stud-shaft is of the same diameter and directly in line longitudinally with the shaft carrying the worm and bevel gear with which the feed-shaft is elevated or lowered, and it is provided with a spline with which a sleeve or coupling having an opening corresponding in shape may be drawn over the abutting ends of the shafts, connecting them rigidly together, whereby when the confining nuts of the head are loosened both head and feed-shaft may be simultaneously elevated or lowered to change their altitudinal position by the rotation of said stud-shaft.

The invention further consists in the construction of a drift pin or key with a cylindrical or bolt-shaped head throughout its length and with parallel sides of decreased diameter, the pin fitting in a corresponding horizontal slot near the lower end of the drill-spindle. The under surface of the pin between the parallel sides is coved out or recessed in arch form longitudinally, that permits of the reception therein of the tapered extremity of the socket end of the drill, which has parallel sides that fit in like sides of the slot of the spindle, which prevent the drill from turning in its socket, and take the strain during boring. An inverted cone upon the lower end of a vertical pin, which is surrounded by a helical spring situated in a bore of the spindle above said drift-pin, fits in a corresponding recess in the upper surface of the cylindrical head of the drift-pin and prevents the same from end movement.

In the accompanying drawings, which make a part of this specification, Figure 1 is a side elevation of my improved drill-press. Fig. 2, Sheet No. 2, is a plan view of the upper part of the same. Fig. 3 is a front elevation. Fig. 4 is a view of the lower end of the drill-spindle G, showing the end of the key or drift-pin T in connection therewith on an enlarged scale. Fig. 5 is a vertical section of the end of the spindle G, taken at right angles to the position seen in Fig. 4, showing a longitudinal section of the key or pin T. Fig. 6 is an end view of the drift-pin T. Fig. 7 is a plan view of the stud-shaft $k'$, pinion $p$, coupling $n$, and connections. Fig. 8 is a side view of the gear-wheel E', sleeve $a$, and collar $c$. Fig. 9 is a like view of the pinion $E^4$, sleeve $a'$, and gear-wheel $E^5$.

Like letters of reference in all the figures indicate the same parts.

A is the housing or standing frame of the drill-press to which the operating mechanism is connected.

B B' are fast and loose pulleys on the shaft C, which communicate, by means of a belt, with motive power. D is a cone-pulley fast on said shaft therewith.

D' is a cone-pulley loose on the shaft C', to which is rigidly connected at one side the pinion E. Both pinion and pulley revolve loosely upon the shaft. A belt leading around the cone-pulleys imparts rotary motion. The shaft C' has also the gear-wheel E' loose thereon, to which is connected the sleeve $a$, that revolves in the bearing $b$, and upon the opposite end of said sleeve is the collar $c$, to prevent lateral motion.

Between the pinion E and wheel E', upon the shaft C', is situated the clutch H, having a lug, $e$, upon each side, by which means it may be brought into connection with corresponding openings in either pinion or collar, whereby either said pinion or gear-wheel may be caused to revolve with the shaft.

$E^9$ $E^{10}$ are bevel-gear connecting drill-spindle G with shaft C'.

$C^2$ is a shaft hung in the bearings $b'$ $b^2$ on the side of the housing, having the pinion $E^4$ and gear-wheel $E^5$, connected together by the sleeve $a'$, which revolves in the bearing $b'$. The shaft has lateral motion in its wheel sleeve and pinion, but is prevented from revolving separately by the spline $f$. (Seen in Figs. 1 and 2.)

Upon the outer or forward end of the shaft $C^2$ is the friction-wheel $E^6$, which revolves between the disk-wheels $E^7$ $E^8$ upon the feed-shaft J. These disk-wheels have their bearings in the arms $g$ $g$ of the bifurcated bracket I, which is secured to the bearing $b^2$, and through which the shaft passes. The wheel $E^7$ revolves loosely upon the feed-shaft, while the lower one, $E^8$, is prevented from revolving separately by the key $h$ in the longitudinal slot $i$, that permits altitudinal movements of the shaft. Pressure is exerted upon these disks to cause their inner surfaces to bear tightly upon the circumference of the friction-wheel $E^6$ by means of the helical springs K K, surrounding the journals $j$ between the outer surfaces of the disk-wheels and the inner surfaces of the bearings of the arms $g$ of the bracket I. The upper disk is merely to exert pressure upon the friction-wheel.

H' is a clutch upon the shaft $C^2$ for the purpose of moving it longitudinally in its bearings, which causes the friction-wheel to be moved to any point within the circumferences of the disk-wheels, by which means the velocity of the feed-shaft is regulated.

L is the movable head of the press; M, the worm-wheel; N, the worm upon the stud-shaft $k$; P, the hand-wheel for revolving said stud-shaft; $l$ $l'$, bevel-gear for rotating the feed-shaft; R, the table; S, the bracket. These parts are common to all drill-presses.

Attached to the side of the head L is the stud-shaft $k'$, held in the bearings $y$, which is directly in line with and abuts upon the end of the shaft $k$. These shafts have a spline, $m$, wherewith the coupling $n$ is caused to engage when it is desired to lock both shafts together. Upon the outer end of the stud-shaft $k'$ is situated the pinion $p$, the teeth of which engage with those of the rack $q$ on the side of the column $r$.

Situated within a horizontal slot in the lower portion of the drill-spindle G is the drift-pin or key T, (seen in detail in Figs. 4, 5, and 6,) which is constructed with a cylindrical or bolt-shaped head, and having parallel sides throughout the length of the pin of less diameter than the head, the slot corresponding in shape. An arch or recessed curve (seen clearly in Fig. 5) extends longitudinally upon the under surface of the pin, and permits of the reception of the upper end of the drill V, which rests therein, the drill having the contracted parallel sides upon its extreme upper end, which fit in the parallel sides of the slot of the spindle and prevent the drill from turning.

Within a bore of the drill-spindle, above the drift-pin, is the pin $s$, surrounded by the helical spring $t$, the upper end of which bears against the shoulder $u$ of the bore, and the lower end against the surface of the inverted cone $v$ on the lower end of the pin $s$, which forces the apex of said cone into a corresponding depression in the upper surface of the drift-pin T. Slight V-notches in this upper surface, in line with the periphery of the spindle, serve to show when the pin is in its proper position.

The operation of the press is as follows: Rotary motion, being imparted to the pulley B on the shaft C by a belt leading from motive power, causes the cone-pulley D to rotate, and by a belt-connection also the pulley D' and its connected pinion loose on the shaft C'. When a rapid rotation of the shaft C' is desired, the clutch H is brought with its lug into contact with the pinion E, which locks the same on the shaft, causing both to revolve with equal velocity. Then motion is imparted to the shaft $C^2$ by the pinion E, gearing into the wheel $E^5$, which rotates its connected pinion $E^4$, that gears into the wheel E' on shaft C'. While the clutch remains out of contact and also in contact with the pinion E the wheel E' is for the time being an idle-wheel, the velocity of speed of the gearing for the purpose of illustrations being as follows: The pinion E, connected to the pulley D', has fifty teeth, and makes one hundred revolutions per minute, gearing thence into the wheel E⁵, having one hundred teeth, causes it to revolve fifty times. The connected pinion E⁴, having fifty teeth, revolves the same number of times, (fifty,) which gearing into the wheel E', having one hundred teeth, revolves it twenty-five times per minute. When it is desired to obtain a slower rate of speed of the shaft C', the clutch H is pushed over, and the lug upon the opposite side brought into contact with the collar c, which holds it, the sleeve a, and wheel E' fast upon the shaft, and as the said wheel E' revolves at the rate of twenty-five revolutions per minute the shaft rotates an equal number of times therewith.

Different degrees of velocity may be imparted to the feed-shaft J by drawing the friction-wheel E⁶ to or from the circumferences of the wheels E⁷ E⁸ by means of the clutch H', that moves the shaft C² longitudinally in its bearings.

To elevate or lower the feed-shaft J and the head L, the nuts x are slackened. Then the coupling n is pushed over onto the stud-shaft k', it having an opening corresponding to the spline m, which locks the stud-shafts k k' together. Then by rotating the hand-wheel P in the proper direction both feed-shaft and head are brought to any desired altitudinal position.

The drill V is made tapering upon the end that engages with the socket, and is constructed with a narrow extremity having parallel sides that fit into the sides of the socket and prevent turning. When it is desired to remove the drill, a tap of a hammer upon an end of the drift-pin T forces the curve of the arch over upon the end of the drill, driving it downward and loose from the socket. The cylindrical form of the head of the drift-pin prevents it from falling down in the socket, it being larger in diameter than the sides, while the connection of the inverted cone v of the pin s, pressed into a corresponding depression of the upper portion of the periphery by the resiliency of the spring t, prevents longitudinal movement in the slot. This form of drift-pin with its connections is equally applicable to spindles of lathes that have horizontal rotation.

I do not confine myself to any particular form of clutch on the shaft C'.

I claim as my invention and desire to secure by Letters Patent—

1. The combination of the cone-pulley D', having the pinion E, both loose on the shaft C', with the wheel E⁵, connected to the pinion E⁴, and wheel E', connected by sleeve a to collar c, the shaft C², having a spline, whereby by means of the lugs of the clutch H being caused to engage with either pinion E or collar c of wheel E to tighten the same upon the shaft C', the velocity of the same may be changed, substantially as herein shown and described.

2. The clutch H on the shaft C', between the pinion E and gear-wheel E', whereby the speed of the said shaft may be changed by alternating the connection of the clutch with either pinion or gear-wheel, substantially as shown and described.

3. The counter-shaft C², operated by suitable mechanism and provided with the friction-wheel E⁶, in combination with the feed-shaft J, having disk-wheels E⁷ E⁸, supported in bearings of the arms g g of the bracket I, which are caused to bear on the circumference of the friction-wheel E by the pressure of the helical springs K, substantially in the manner herein described, and for the purpose set forth.

4. The stud-shaft k', having a pinion, p, in combination with the coupling n, and shaft k (both shafts having spline m) for imparting rotary motion to the shaft k' by means of the wheel P, substantially as herein shown and described.

5. The stud-shaft k', having pinion p on the head L, rotated by means of its connection with the shaft k, through the spline m, and coupling n, in combination with rack q of column r, whereby the head L and feed-shaft J may be raised or lowered simultaneously, substantially as herein shown and described.

6. A drift-pin, T, constructed with a cylindrical or bolt-shaped head throughout its length of greater diameter than its parallel sides, and with an arched or curved recess, in combination with a corresponding-shaped slot in the drill-spindle, and pin s, having inverted cone v, actuated by the spring t, whereby the cone is caused to engage in a depression in the head of the drift-pin, substantially as herein shown and described.

WILLIAM EVANS.

Witnesses:
THOMAS J. BEWLEY,
JOHN H. EVANS.